Sept. 21, 1965   W. A. BROWN   3,207,560
UNLOADING DEVICE
Filed Dec. 26, 1962   3 Sheets-Sheet 1
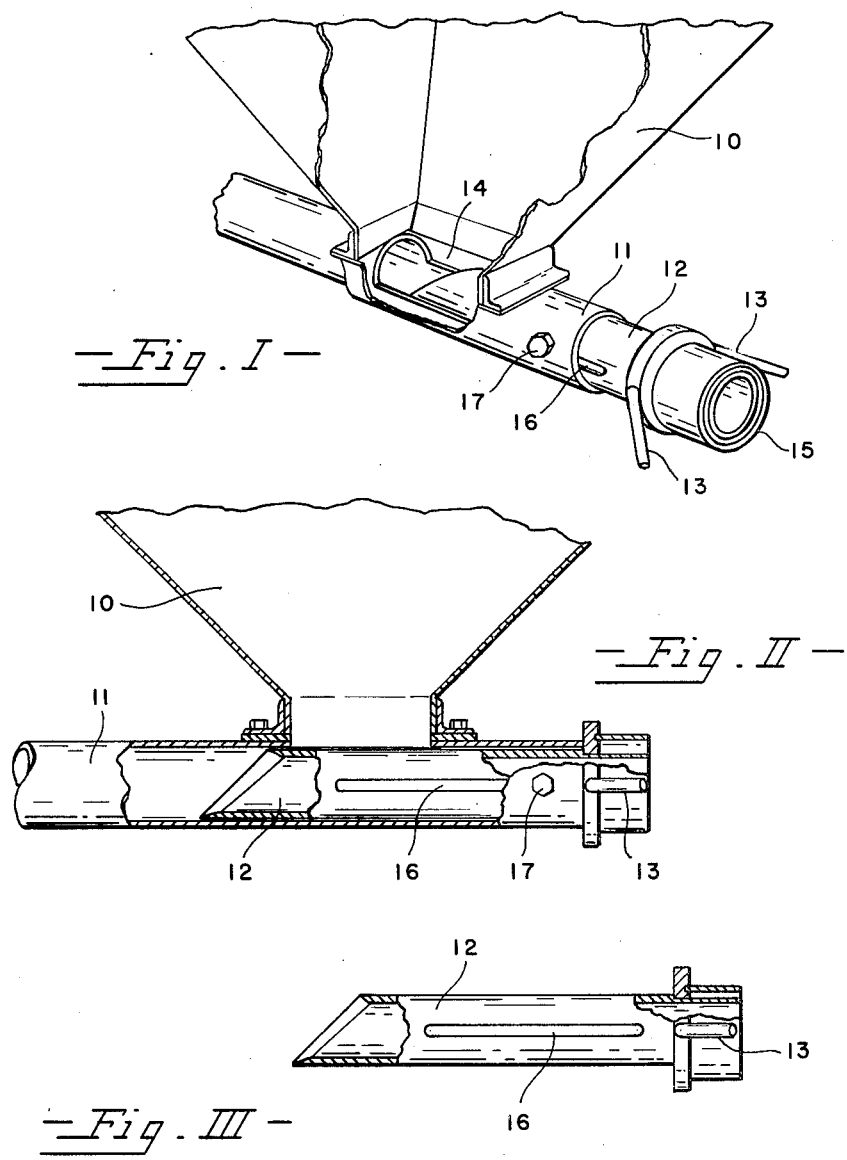
WILBUR A. BROWN   *INVENTOR.*
BY H B Roberts
ATTORNEY.

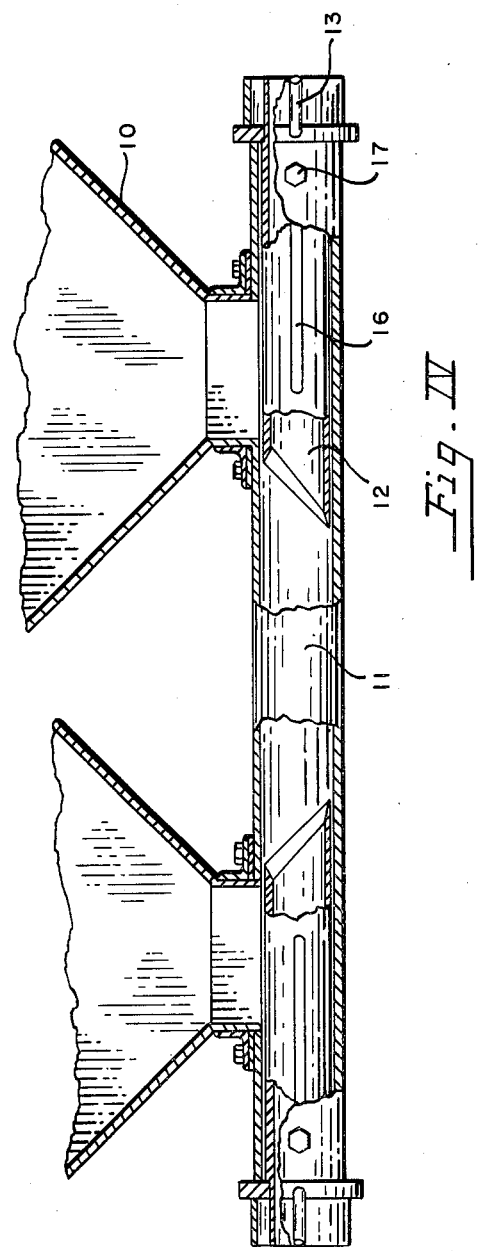

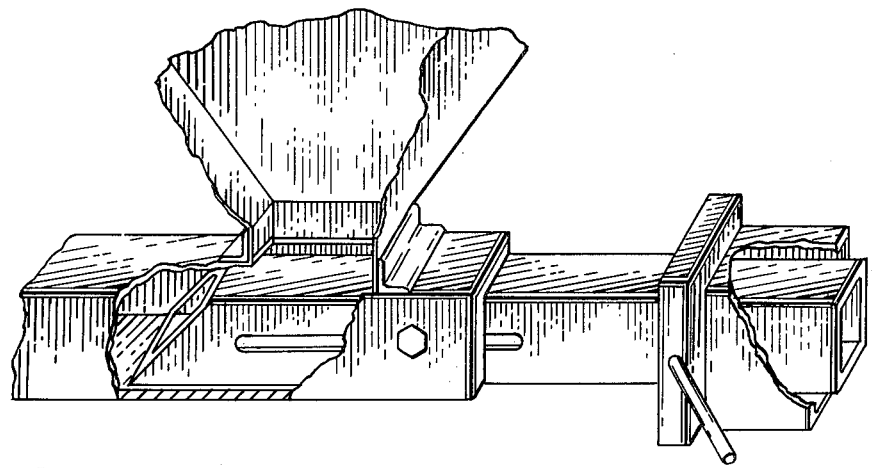
Fig. V
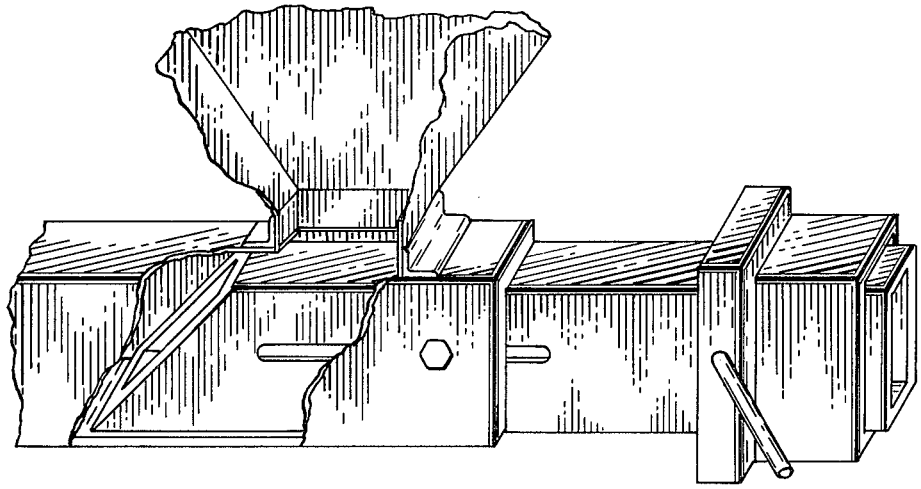
Fig. VI
WILBUR A. BROWN INVENTOR.
BY
ATTORNEY.

United States Patent Office 3,207,560
Patented Sept. 21, 1965

3,207,560
UNLOADING DEVICE
Wilbur A. Brown, Springfield, Mass., assignor to Monsanto Company, a corporation of Delaware
Filed Dec. 26, 1962, Ser. No. 247,259
10 Claims. (Cl. 302—52)

This invention relates to an improved apparatus for unloading hoppers, and is more particularly concerned with an unloading device wherein an unloading nozzle is inserted in an unloading tube for removing the materials from the hopper.

With the introduction of multiple purpose hoppers which may be transported in a variety of ways, unloading the contents from the hoppers has become something of a problem. It has been necessary to design unloading devices adapted for utilization in connection with a variety of unloading attachments supplied by various customers. Also, the utilization of forced air and vacuum as an aid in the unloading process has created the necessity for improved unloading equipment. Illustrative of a variety of unloading devices are those disclosed in U.S. Patents 2,650,726 and 2,929,158.

It is an object of this invention to provide an improved unloading device. It is another object of this invention to provide an unloading device which can be used to quickly discharge the contents from a hopper into any of a large variety of containers. It is another object of this invention to provide an unloading device which is characterized by a telescoping nozzle. These and other objects will be apparent from the following description.

This invention is concerned with, in combination, a hopper for the storage of finely-divided material having at least one discharge opening, an unloading device attached to the discharge opening, the unloading device being comprised of an unloading tube having an open ended unloading nozzle on the inside of the tube and being in slidable engagement with the tube. The unloading device may also be characterized as an outer tubular member and an inner tubular member in slidable engagement with each other.

The invention may be more fully understood from the attached drawings which are not intended to be limitations on the scope of the invention. In the drawings, FIGURE 1 is a partially cut-away perspective of one embodiment of this invention; FIGURE 2 is a cross-section of the unloading device of this invention and FIGURE 3 is a partially cut-away elevation of the unloading nozzle of this invention. FIGURE 4 is a partially cut away perspective of one embodiment of the invention showing the unloading tube in communication with more than one hopper and more than one nozzle. FIGURE 5 is a perspective of one embodiment of the invention showing a substantially square unloading tube and communicating nozzle and FIGURE 6 is a perspective of one embodiment of the invention showing a substantially rectangular unloading tube and communicating nozzle.

In the practice of the invention, the hopper, 10 has attached thereto an unloading tube 11 with an opening which communicates with an opening in the hopper. The unloading tube 11 has an unloading nozzle 12 in slidable or telescoping relationship with the unloading tube 11. When the hopper contains any finely-divided substance, the unloading nozzle 12 will be inserted into the unloading tube 11 until the opening 14 is entirely closed. Handles 13 may be used to regulate the depth of penetration of the unloading nozzle 12 in the unloading tube 11. In order to unload the hopper, the unloading nozzle 12 is withdrawn in the unloading tube 11 to a point where it exposes at least a portion of the hopper opening 14. If desired, the flow of material may be completely shut off by inserting the unloading nozzle 12 until the hopper opening 14 is entirely closed or the flow may be regulated by regulating the depth of penetration of the nozzle in the tube.

This invention is particularly characterized by the unloading nozzle 12 which is a truncated hollow device, which may also be characterized as a tube or a nozzle, wherein the truncating plane forms at least one angle of not more than 90 degrees with the central axis of the unloading nozzle. Obviously, if the truncating plane is at an angle of 90 degrees from the central axis, all of the angles at the axis will be the same and the plane of the opening would be at right angle to the nozzle. Normally, one of the angles at the intersection of the truncating plane and the central axis of the nozzle will be less than 90 degrees in which instance one portion of the unloading tube will be longer than the opposite portion. In this way, the unloading nozzle may be easily inserted into the unloading tube and the flow of material from the hopper can be easily regulated by controlling the amount of opening by regulating the depth of insertion of the unloading nozzle 12 into the unloading tube 11. The angle of the truncating plane in relation to the central axis, or length of the unloading nozzle 12 is not critical but best results are obtained when it is not perpendicular. Normally, the smaller angle will be about 25 degrees to 50 degrees. However, satisfactory results may be obtained when the truncating plane is perpendicular to the central axis.

The unloading nozzle 12 has means 15 for attaching to any of a large variety of discharge devices. If desired, a narrow slot 16 may be made in the unloading nozzle 12 and a stud 17 inserted through the unloading tube 11 to engage the slot 16 in order to limit the slidability of the unloading nozzle 12 in the unloading tube 11. This will prevent inadvertently removing the unloading nozzle 12 completely from the unloading tube 11 and thus spilling the contents.

Although the invention is illustrated by means of a cylindrical unloading nozzle (FIGURE 1), any cross-sectional shape may be utilized and will probably depend on the type of material that is being unloaded from the hopper. For example, square (FIGURE 5), rectangular (FIGURE 6), hexagonal, etc., cross-sectional devices may be used and in many instances may be better than a cylindrical device. For instance, when high vacuum is desired in the nozzle system, it may be desirable to use a non-cylindrical unloading nozzle and unloading tube in order to prevent rotation of the tube without resorting to a slot and stud such as illustrated in the drawings. Also, the size of the unloading tube and unloading nozzle are not critical and will obviously be determined by the size and shape of the hopper. For most uses, the unloading nozzle will range from about 3 inches in diameter to about 9 inches in diameter. Likewise, the wall thickness of the unloading tube and unloading nozzle are not critical and will be determined by the type of materials being utilized and the size of the structure. These wall structures may vary from rather thin, e.g., ⅛ inch to reasonably thick, e.g., ¾ inch. The unloading tube of the apparatus described herein may communicate with more than one hopper and more than one unloading nozzle.

The materials of fabrication for the purpose of this invention are not critical and will be determined by persons skilled in this art to achieve maximum utility with minimum weight. The unloading tube 11 is most likely to be fabricated from some well known metal such as steel, aluminum, bronze, etc., although it may be fabricated from well known rigid plastics such as methacrylate resins, vinyl chloride polymers and copolymers, fluorocarbon polymers, polyamides, etc.

Excellent results are achieved when the unloading nozzle is fabricated from a rigid plastic composition such as methacrylate resins, vinyl chloride polymers and copolymers, fluorocarbon polymers, polyamides, etc., although obviously any of the various metals such as steel, aluminum, bronze, etc., may be utilized in making the unloading nozzle. A particularly useful composition is a graft copolymerized chlorinated polyethylene and polyvinyl chloride.

The materials which may be hauled in the hoppers and unloaded by means of the herein described invention are not critical and may be any of the various materials which are customarily hauled in hoppers, e.g., polystyrene pellets, polyvinyl chloride pellets, polyethylene pellets, polypropylene pellets, various copolymers of styrene, ethylene, propylene, etc., with other monomers, etc., The invention is most useful in the conveyance of finely-divided materials which may range from very small particles to very large particles and which may range from almost liquid to very hard particles.

The invention has been illustrated with certain representative embodiments and details which have been shown for the purpose of illustration. It will be apparent to those skilled in the art that various changes and embodiments may be made without departing from the spirit and scope of the invention.

What is claimed is:

1. In combination, a hopper for the storage of finely-divided material having at least one discharge opening, an unloading device attached to the discharge opening, said unloading device consisting of an unloading tube attached to the said hopper in fixed relationship thereto and having an opening in communication with the said discharge opening of the said hopper and having an unloading nozzle on the inside of said tube in slidable engagement with said tube, the inner end of said nozzle being open to receive the finely-divided material and the outer end being adapted for attachment to a discharge means, said unloading nozzle containing an elongated slot therein, said unloading tube having a stud attached thereto and projecting through the wall of the said unloading tube on the inside, and said stud being in slidable engagement with the said slot in the said unloading nozzle to prevent inadvertent disengagement of the said unloading nozzle from the said unloading tube.

2. The apparatus of claim 1 wherein the unloading nozzle is a truncated structure having a truncating plane which forms at least one angle of not more than 90 degrees at the central axis of the nozzle.

3. The apparatus of claim 1 wherein the unloading tube and the unloading nozzle are substantially cylindrical in cross-section.

4. The apparatus of claim 1 wherein the unloading tube and the unloading nozzle are substantially rectangular in cross-section.

5. The apparatus of claim 1 wherein the unloading tube and the unloading nozzle are substantially square in cross-section.

6. The apparatus of claim 1 wherein the unloading tube and the unloading nozzle have means for limiting slidable engagement.

7. The apparatus of claim 1 wherein the unloading tube is comprised of metal and the unloading nozzle is comprised of a substantially rigid plastic composition.

8. The apparatus of claim 1 wherein the unloading tube communicates with more than one hopper.

9. The apparatus of claim 1 wherein the unloading tube communicates with more than one unloading nozzle.

10. The apparatus of claim 1 wherein means are provided for conveying air into the apparatus.

References Cited by the Examiner

UNITED STATES PATENTS

| | | | |
|---|---|---|---|
| 2,310,620 | 2/43 | Dye | 302—42 |
| 2,650,726 | 9/53 | Aller | 302—52 |
| 3,136,584 | 6/64 | Whitlock | 302—52 |

FOREIGN PATENTS

| | | |
|---|---|---|
| 876,072 | 5/53 | Germany. |
| 150,765 | 2/32 | Switzerland. |
| 345,293 | 4/60 | Switzerland. |

SAMUEL F. COLEMAN, *Primary Examiner.*

ANDRES H. NIELSEN, *Examiner.*